US005418757A

United States Patent [19]

Rau et al.

[11] Patent Number: 5,418,757

[45] Date of Patent: May 23, 1995

[54] LONG LIFE BATTERY OPERATED ACOUSTIC UNDERWATER BUOY RELEASE SYSTEM

[75] Inventors: Brien G. Rau; André W. Olivier, both of New Orleans, La.

[73] Assignee: The Laitram Corporation, Harahan, La.

[21] Appl. No.: 255,711

[22] Filed: Jun. 7, 1994

[51] Int. Cl.[6] ................ H04B 1/59

[52] U.S. Cl. ................ 367/4

[58] Field of Search ................ 367/4; 441/2, 33; 114/230, 293

[56] References Cited

U.S. PATENT DOCUMENTS 5,022,013 6/1991 Dalton et al. ................ 367/4

5,184,328 2/1993 Dumestre, III ................ 367/4

*Primary Examiner*—Daniel T. Pihulic

*Attorney, Agent, or Firm*—Laurence R. Brown; James T. Cronvich

[57] ABSTRACT

A battery operated system 20 responds to coded acoustic signals 15 for releasing a buoyed housing from an underwater anchor 21 to carry a retrieval line attached to a retrievable underwater object to the water surface. A novel tethering mechanism 26 is provided for attaching the housing to a line 25 tethered to the anchor and for releasing it in response to the coded acoustic signals. The tethering mechanism operates in two diverse modes. Thus the housing is released from its tether line thermally by battery power which melts an expandable wax body in a thermal actuator 36 to move an actuating member 37 through a line release stroke. However, the tether line is attached by a manually actuated latching mechanism 45, 47 provided for retethering the housing at a different location without draining battery power for resetting the latching mechanism. In one embodiment, the angle of the line leaving a latching compartment outwardly is restricted to prevent substantial changes in line orientation thereby to reduce fouling of the tether line in response to underwater currents. The tether line attaching mechanism comprises in separate embodiments either a set of line clamping cams or a latched set of levers, either of which releases the line in response to thermal movement of an actuating member.

14 Claims, 2 Drawing Sheets

LONG LIFE BATTERY OPERATED ACOUSTIC UNDERWATER BUOY RELEASE SYSTEM

TECHNICAL FIELD

This invention relates to system for acoustically releasing underwater buoys held by a tether line to an anchor in the vicinity of retrievable underwater objects and more particularly it relates to such systems employing thermally actuated release of tether line retaining mechanisms powered by batteries.

BACKGROUND ART

Underwater buoy release systems responsive to acoustic signals are known in the prior art as exemplified by U.S. Pat. Nos. 5,022,013 to W. Dalton, et al., Jun. 4, 1991 and 5,184,328 to A. Dumestre, III, Feb. 2, 1993.

The latter patent discloses a system employing a thermally responsive actuator for both releasing and reattaching a tether line attaching a buoyed acoustic system to an object anchored underwater. Thus, upon receipt of a coded acoustic signal, a battery is connected to melt a wax body which expands to force an actuator member over a stroke which serves to detach the buoy from the tether line. There are significant advantages to use of the thermally responsive actuator for release from the tether line, however, this prior art system has the disadvantage of heavy battery drain whenever the buoy is reset for reuse which requires remelting the wax body.

Furthermore the line in prior art acoustic release systems does not always respond to the acoustic signal to permit the buoy to rise to the water surface because it may be tethered to the acoustic system in such a manner that the line may become fouled by action of underwater currents and waves.

It is therefore an object of the present invention to provide an improved thermally responsive acoustic release system that resolves these prior art problems.

DISCLOSURE OF THE INVENTION

In an acoustic release system for detaching a buoyed body from its tether to an underwater anchor making a retrievable object such as a hydrophone cable lying on the sea bottom, a release mechanism is provided that is mechanically and manually set to attach the tether line and is thermally released from the line in response to an acoustic signal. Thus the mechanism requires battery power only for the period of time required to release the tether line to thereby produce a long battery life.

The release mechanism responds to an actuating member stroke afforded by expansion of melting wax. In one embodiment, the actuating member stroke operates a levered latching mechanism to unlatch a latch member that retains the tether line. In another embodiment, the actuating member stroke pushes the line out of a line clamping mechanism comprising a set of rotatable cams having gripping teeth for grasping the line against axial movement along the line but permitting transverse movement of the line out of the gripping teeth.

By mounting the line retaining mechanism in an open ended cylindrical compartment extending from a hermetically sealed acoustic signal responsive body, the tether line may be vertically oriented and confined in a conical region of limited movement restricting the angle of departure of the line within an acute angle, thereby to orient the buoyed body in a fashion not likely to foul the tether line by the action of waves or underwater currents.

Other features, objectives and advantages of the invention will be found throughout the following description, claims and accompanying drawings.

BRIEF DESCRIPTION OF THE DRAWINGS

In the accompanying drawings, wherein like reference characters are used in the various views for similar features to facilitate comparison.

THE PREFERRED EMBODIMENTS

Figure 1:
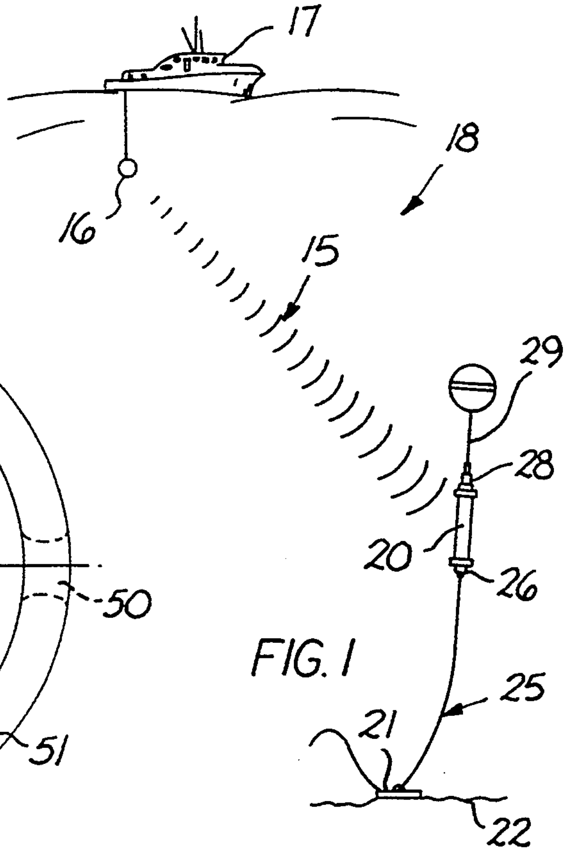
FIG. 1 is a diagrammatic system diagram of the acoustic release system embodying the invention.

Coded acoustic waves 15 are sent from the sonic transmitter 16 carried by the vessel 17 on the surface of the water body 18 for reception at the underwater acoustic system 20 contained in a hermetically sealed housing body. A weighted anchor 21 is positioned on the bottom 22 of the body of water 18. A tether line 25 attached to the anchor 21 is releasably held in a line retention mechanism 26 carried by the acoustic system housing 20. This housing 20 is buoyed at the upper end 28 by a suitable lighter than water float at line 29. This float has sufficient buoyancy to carry the acoustic system housing and an accompanying line attached to an underwater object such as a hydrophone cable (not shown) upwardly to the water surface 30 when the line retention mechanism 26 releases the tether line 25 in response to the coded acoustic signal 15. Normally the buoyed housing 20 is retained near the bottom 22 of the water body 18 to avoid fouling with surface vessels 17, and the like, until it is desirable to retrieve the underwater object, typically a hydrophone cable, that may be retrieved for reuse at some other location.

Figure 2:
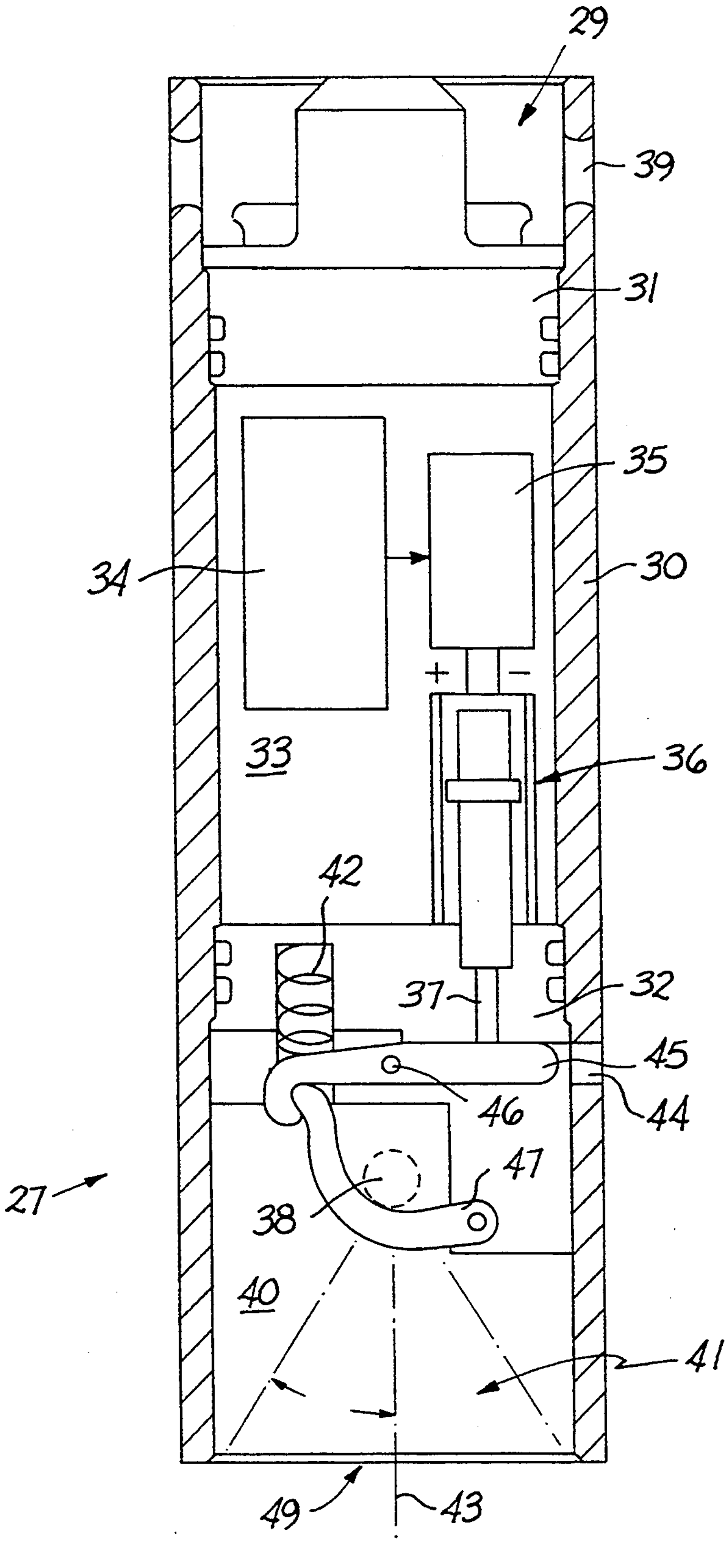
FIG. 2 is a side view, partly in section, of a housing incorporating a first acoustic response system embodiment of the invention providing a latching lever system for retaining and detaching a tether line to an underwater anchored object.

As seen in FIG. 2 the acoustic system housing 20 comprises a cylindrical outer shell 30, hermetically sealed at plugs 31, 32 to provide an inner compartment 33 for residence of the acoustic response system 34 with accompanying acoustic transducer for actuating the battery 35 to thermally heat the thermal actuator 36 for a given period of time sufficient to move the actuating rod 37 for releasing the retained line 38. Such acoustic response systems 34 and thermal actuators 36 are well known in the art as exemplified by the Dumestre U.S. Pat. No. 5,184,328. The thermal actuators are commercially available from Caltherm Corporation located in Bingham Farms, Mich. 48025.

The upper open ended compartment 29 with apertures 39 permit attachment of a buoyant device of proper buoyancy for reaching the surface carrying a retrieval line attached to the underwater object to be retrieved. The lower open ended compartment 40 of cylindrical shape has a length below the plug 32 and a diameter that provides for a limited movement of the downwardly projected line 38 within the conical area 41 so that the line can move only the extent of acute angle a away from the cylinder axis 43. This feature considerably reduces the chances of the line 38 to foul in the presence of waves or water currents. While the housing may be preferably vertically oriented in the water, this recessed open ended compartment permits the latch to operate omnidirectionally, whatever position may be taken in the underwater currents.

The thermally actuated unlatching response to a coded acoustic signal causes battery 35 to heat the thermal actuator 36 long enough for the actuating member 37 to move in a downward stroke, thereby pivoting lever arm latch 45 about pivot point 46 enough to overcome the bias of spring 42 and unlatch the pivoted line retention arm 47. Thus the buoyancy of the buoyed housing body permits the retained tether line 38 to escape downwardly from the open mouth 49 of the open ended compartment 40.

However, to reduce battery drainage, this mechanism provides for the manual resetting of retention arm 47 about a tether line 38 for reuse of the acoustic system without expending battery energy to reheat the thermal actuating member 36. The prior art system required thermal reheating of the thermal actuating member 36 to reset the mechanism for retaining a further line.

The aperture 44 in the shell 30 provides for manually releasing the latch 45 by insertion of a screwdriver or like tool.

Figure 4:
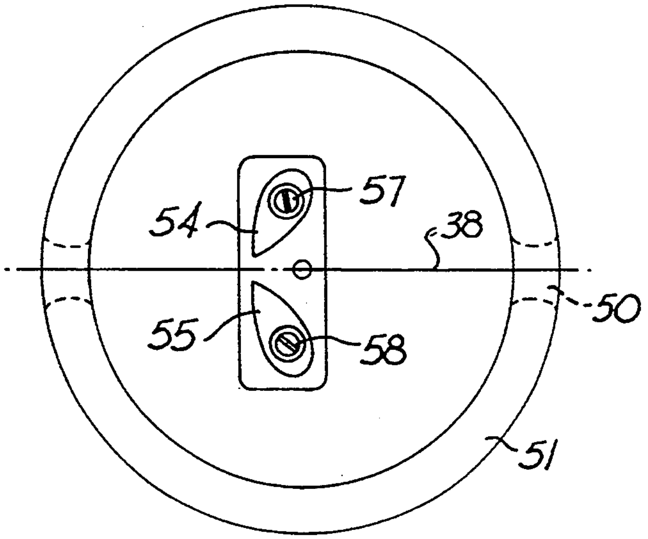
FIG. 4 is a bottom view of the rotatable cam release mechanism together with a surrounding hood member.
Figure 5:
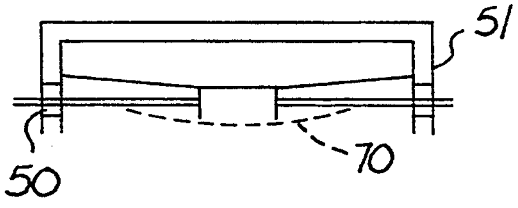
FIG. 5 is a side view, partly in section, of a lowermost skirt about the rotatable cams illustrating the line feed path.
Figure 3:
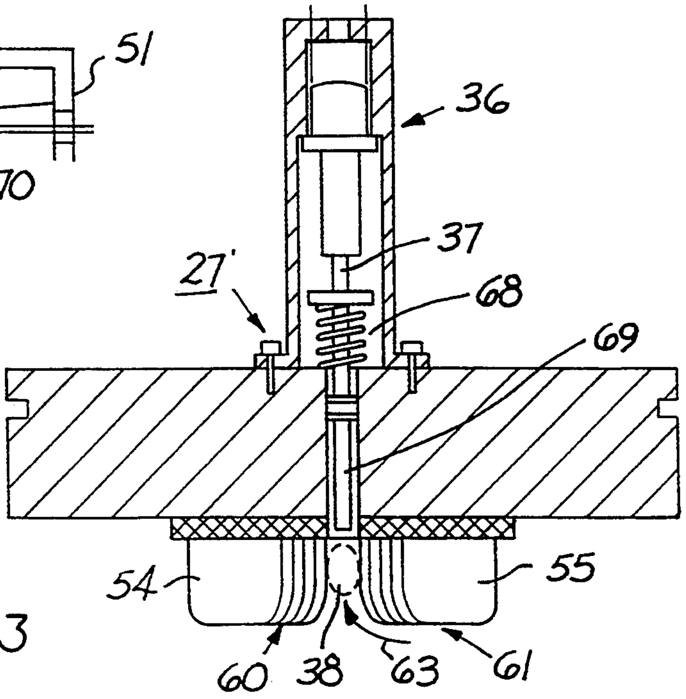
FIG. 3 is a side view, partly in section, of a further tether line release mechanism embodiment of the invention providing a set of rotatable cams for grasping and releasing the tether line.

A further embodiment of the invention is shown in FIGS. 3 to 5. As seen best from FIG. 4, the tether line 38 is passed through the apertures 50 in skirt 51 between the two spring-loaded manually rotatable cams 54, 55 having parallel axes about pivot pins 57, 58. Thus the cams will clamp the line 38 securely between them. Such gripping cam cleats are commercially available from Schaefer Marine in New Bedford, Me. 02745.

As may better be seen from FIG. 3, the line is inserted between the gripping teeth 60, 61 respectively located on cams 54 and 55 in the direction of arrow 63. The vertically oriented gripping teeth 60, 61 thus prevent pay out of the line axially through the clamped teeth, but afford a degree of lateral movement downwardly in the direction of the axes of the cams 54, 55. Thus the actuator member 37 of thermal actuator 36 in its downward stroke, by overcoming the bias of spring 68, moves the plunger 69 downwardly to dislodge the clamped line 38 from the cam teeth into the path 70 of FIG. 5, which permits movement of the skirt 51 along the line 38.

This invention therefore improves the state of the art with a long life battery actuated acoustic response system that release buoys held tethered to underwater anchored objects for floating up to the water surface carrying a retrieval line (not shown). The novel mechanism of this invention operating in a new mode to resolve prior art problems of battery consumption and line fouling is thus defined with particularity in the following claims.

We claim:

1. The improvement in a battery-operated release system responsive to an acoustic signal for detaching a buoyed housing assembly from an attaching line retaining the housing to an underwater anchor at the site of an underwater retrievable object to float when detached to the water surface for increasing battery life, comprising in combination:

said housing assembly containing a battery, means for attaching a lighter than water flotation buoy that will not lift the anchor but will serve to carry a line upward with the housing to the water surface, and an acoustic transducer responsive to a predetermined acoustic signal for coupling said battery to a battery operated heater, a thermal actuator device having a chamber selectively heatable by said battery when triggered in response to said acoustic signal, which chamber contains a thermally expandable substance for moving an actuating member extending from the chamber over an actuating stroke in response to temperature changes, a manually closable latch mechanism operable independently from said battery for retaining a line releasably coupled to the housing assembly in the vicinity of said underwater retrievable object thereby to avoid battery drain for attaching the line to the housing for reuse of the assembly, and a release member movable by said actuating member in response to temperature increases from said battery operated heater triggered by said acoustic signal to unlatch said line when retained by the latch, thereby to release the housing assembly for flotation to the surface.

2. The improvement of claim 1 wherein said housing assembly further comprises:

a closed compartment containing an acoustic transducer, said battery and said thermal actuator device, with said actuating member extending therefrom, and an open ended recessed compartment about said actuator member disposing said latch mechanism for receiving a line releasably latched thereto for retaining the housing member attached to said anchor.

3. The improvement of claim 2 wherein said housing member further comprises a cylindrically shaped body with said open ended compartment open along a cylindrical axis at one end to receive said line for latching by said latch mechanism, the recessed compartment having a diameter and a depth serving to produce a limited angular departure of a latched line outwardly from the cylindrical axis.

4. The improvement of claim 3 wherein said cylindrically shaped body has a passageway through a cylindrical wall for entry of a tool to mechanically release said latch mechanism.

5. The improvement of claim 1 further comprising spring biasing means compressible by movement of said actuating member in a direction responding to increased temperature for retaining said latching mechanism in contact with the actuating member.

6. The improvement of claim 1 wherein said latch mechanism further comprises two pivotable lever members, a first line retaining lever member being pivoted at one end from which extends a movable latching arm, and a second actuating lever member being pivoted at an intermediate position with an actuating arm member extending in a direction from said intermediate position movable by said actuating stroke and a line retaining lever arm extending in a direction from the intermediate pivot position for engaging the movable latching arm at a position retaining said line in a latched position so that actuation by said actuating stroke permits said latching arm to move to a position releasing said line.

7. The improvement of claim 1 wherein said latch mechanism comprises a cam cleat mechanism adjustable to grip the line between two relatively rotatable cams having parallel axes of rotation with gripping teeth on the cams for restricting pay out of the line through the gripping teeth, but permitting release of the line by moving the line away from said housing and the gripping teeth.

8. The improvement of claim 7 wherein an open ended cylindrical compartment extends from said housing containing two aligned apertures for feeding the line through the cylindrical compartment to extend through the gripping teeth.

9. The improvement of claim 7 wherein a push rod engages said actuating member to push said line out of said gripping teeth.

10. The improved low-battery drain acoustic release system for attaching a buoyed body to and detaching the buoyed body from a tether line anchored by an underwater anchor, comprising in combination, a release mechanism provided with means for mechanically and manually attaching the buoyed body to the tether line independent from battery power, a battery, and heater means for thermally releasing the body from the tether line by actuating said heater means from said battery in response to a coded acoustic signal wherein the battery is used for the release of the body from the tether line and is not discharged by manual attachment of the buoyed body to the tether line.

11. The release system defined in claim 1 further comprising an open mouthed cylindrical housing disposed about a line attachment portion of the latch mechanism for extending outwardly in the water along a cylindrical housing axis for encompassing the line to provide a limiting conical degree of movement of the line confined to an acute angle from the axis.

12. The release system defined in claim 6 wherein said latch mechanism further comprises a mechanism operated by one lever member for retaining the tether line, and wherein the release member moves a further lever member through a stroke unlatching the latch mechanism that retains the tether line.

13. The release system defined in claim 1 wherein said closeable latch mechanism further comprises a rotatable cam mechanism for clamping the tether line to the housing assembly and wherein the release member for unlatching the tether line moves an actuating member through a stroke pushing the line out of the rotatable cam mechanism.

14. The release system defined in claim 13 wherein the rotatable cam mechanism further comprises a set of rotatable cams having gripping teeth on respective cams having gripping teeth oriented for grasping the line therebetween to prevent axial movement but permitting transverse movement of the line out of the gripping teeth in response to the actuating member stroke.

* * * * *